US012745763B2

(12) United States Patent
Kawai et al.

(10) Patent No.: US 12,745,763 B2
(45) Date of Patent: Sep. 29, 2026

(54) FISHING LINE GUIDE AND FISHING ROD

(71) Applicant: GLOBERIDE, Inc., Higashikurume (JP)

(72) Inventors: Kazuki Kawai, Tokyo (JP); Toshiki Morioka, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/294,971

(22) PCT Filed: Oct. 27, 2022

(86) PCT No.: PCT/JP2022/040047
§ 371 (c)(1),
(2) Date: Feb. 2, 2024

(87) PCT Pub. No.: WO2023/090105
PCT Pub. Date: May 25, 2023

(65) Prior Publication Data

US 2025/0081951 A1 Mar. 13, 2025

(30) Foreign Application Priority Data

Nov. 18, 2021 (JP) ................................ 2021-187696

(51) Int. Cl.
*A01K 87/04* (2006.01)

(52) U.S. Cl.
CPC .................................. *A01K 87/04* (2013.01)

(58) Field of Classification Search
CPC ...... A01K 87/04; A01K 87/06; A01K 87/008; A01K 87/009
See application file for complete search history.

(56) References Cited

U.S. PATENT DOCUMENTS

| | | | | |
|---|---|---|---|---|
| 2,502,845 A * | 4/1950 | Hoffman | ................ | A01K 87/04 29/523 |
| D270,268 S * | 8/1983 | Ohmura | ....................... | D22/143 |
| 4,428,141 A * | 1/1984 | Kovalovsky | ........... | A01K 87/04 254/416 |

(Continued)

FOREIGN PATENT DOCUMENTS

| | | | | |
|---|---|---|---|---|
| AU | 2023367815 A1 * | 1/2025 | ............. | A01K 87/04 |
| CN | 2559214 Y * | 7/2003 | | |

(Continued)

OTHER PUBLICATIONS

May 2, 2024, International Preliminary Report on Patentability issued in International Patent Application No. PCT/JP2022/040047.

(Continued)

*Primary Examiner* — Katelyn T Truong
(74) *Attorney, Agent, or Firm* — Oliff PLC

(57) ABSTRACT

A fishing line guide that provides good operability to a fishing rod, that is efficiently reduced in weight, and that is less likely to be damaged. A fishing line guide includes: a guide leg serving as a fixed portion with respect to a rod; a fishing line insertion portion through which a fishing line is inserted; and a connecting portion rising from the guide leg and connected to the fishing line insertion portion. A rib protruding to a rod tip side from the vicinity of the fixed portion of the guide leg toward the fishing line insertion portion is formed.

6 Claims, 21 Drawing Sheets

(56) References Cited

U.S. PATENT DOCUMENTS

| | | | | | |
|---|---|---|---|---|---|
| 5,177,892 | A * | 1/1993 | Ohmura | A01K 87/04 43/24 |
| 5,417,007 | A * | 5/1995 | Stotesbury | A01K 87/04 43/24 |
| 6,154,998 | A | 12/2000 | Hashimoto et al. | |
| 2005/0097804 | A1* | 5/2005 | Lee | A01K 87/04 43/24 |
| 2014/0373427 | A1 | 12/2014 | Watanabe et al. | |
| 2017/0118967 | A1 | 5/2017 | Omura | |
| 2021/0029981 | A1 | 2/2021 | Watanabe et al. | |

FOREIGN PATENT DOCUMENTS

| | | | | | |
|---|---|---|---|---|---|
| JP | H10-313744 | A | | 12/1998 | |
| JP | H11-000084 | A | | 1/1999 | |
| JP | H11-155428 | A | | 6/1999 | |
| JP | 2000-262187 | A | | 9/2000 | |
| JP | 2002-262725 | A | | 9/2002 | |
| JP | 2013-201953 | A | | 10/2013 | |
| JP | 2016-119887 | A | | 7/2016 | |
| JP | 2022131685 | A | * | 9/2022 | B29C 70/54 |
| KR | 19990022472 | U | * | 7/1999 | A01K 87/04 |
| KR | 19990040233 | U | * | 11/1999 | A01K 87/04 |
| KR | 20000020428 | U | * | 12/2000 | A01K 87/04 |
| KR | 200366928 | Y1 | * | 11/2004 | A01K 87/04 |
| WO | 2015/178174 | A1 | | 11/2015 | |

OTHER PUBLICATIONS

Feb. 20, 2025 Office Action issued in Japanese Patent Application No. 2021-187696.

Feb. 4, 2025 Examination Report issued in Australian Patent Application No. 2022394058.

Dec. 13, 2022 International Search Report issued in International Patent Application No. PCT/JP2022/040047.

Oct. 22, 2025 Office Action issued in Chinese Application No. 202280058000.X.

Jun. 4, 2026 Office Action issued in Chinese Patent Application No. 202280058000.X.

May 26, 2026 Ofice Action issued in Singapore Application No. 11202401351T.

* cited by examiner

FISHING LINE GUIDE AND FISHING ROD

TECHNICAL FIELD

Cross Reference

The present application claims priority based on Japanese Patent Application No. 2021-187696 (filed on Nov. 18, 2021), the contents of which are incorporated herein by reference in their entirety.

The present invention relates to a fishing line guide and a fishing rod to which the fishing line guide is mounted.

BACKGROUND ART

In the related art, a fishing rod to which various fishing reels such as a spinning reel and a double bearing reel can be mounted has been known, and fishing line guides that guide a fishing line paid out from the fishing reel are attached to such a fishing rod at predetermined intervals in a longitudinal direction of the fishing rod. Usually, the fishing line guide includes a fishing line insertion portion (guide ring holding portion to which a guide ring is attached) through which the fishing line is inserted; a guide leg fixed to a rod of the fishing rod; and a connecting portion connecting the fishing line insertion portion and the guide leg. In addition, such a fishing line guide is formed in a plate shape from a metal, a synthetic resin, and a fiber-reinforced resin (refer to FIG. 8 of Patent Literature 1), and is fixed to the rod by placing the guide leg on the rod, fixing the guide leg with a yarn, and applying a resin thereto.

CITATION LIST

Patent Literature

Patent Literature 1: JP 2016-119887 A

SUMMARY OF INVENTION

Technical Problem

Since the fishing line guide having a plate shape as described above does not have sufficient rigidity, when the thickness is increased in order to ensure rigidity, there is a possibility that the fishing line guide is increased in weight and receives wind resistance and operability of the fishing rod decreases. In addition, when the thickness of the fishing line guide is increased, the appearance also deteriorates.

Furthermore, the fishing line guide described above has a shape in which the connecting portion rises in an arc shape from the guide leg fixed to a rod surface and transitions to the fishing line insertion portion. The rising portion transitioning from the guide leg to the connecting portion is a portion to which the largest load (bending stress) is applied, and when the rigidity of the portion is not sufficient, the fishing line guide is prone to damage such as bending or breaking.

The present invention has been made in view of the above-described problems, and an object of the present invention is to provide a fishing line guide that provides good operability to a fishing rod, that is efficiently reduced in weight, and that is less likely to be damaged, and the fishing rod to which such a fishing line guide is mounted.

Solution to Problem

In order to achieve the above-described object, according to the present invention, there is provided a fishing line guide comprising: a guide leg serving as a fixed portion with respect to a rod; a fishing line insertion portion through which a fishing line is inserted; and a connecting portion rising from the guide leg and connected to the fishing line insertion portion. A rib protruding to a rod tip side from the vicinity of the fixed portion of the guide leg toward the fishing line insertion portion is formed.

According to the fishing line guide with the above-described configuration, since the rib protruding to the rod tip side from the vicinity of the fixed portion of the guide leg toward the fishing line insertion portion is formed, rigidity can be efficiently ensured without increasing the weight. Namely, in the fishing line guide, when the fishing line is caught, the largest load acts in the vicinity of the fixed portion of the guide leg, but since the rib is formed from the portion toward the fishing line insertion portion, an efficient reinforcing effect can be obtained. In addition, since a sufficient reinforcing effect can be obtained, damage such as scratching, bending, or breaking is prevented from occurring in the guide leg or the connecting portion.

In addition, the present invention provides a fishing rod to which the fishing line guide described above is mounted.

In such a fishing rod, by installing a plurality of the fishing line guides that are efficiently increased in rigidity without an increase in weight, the weight of the entirety of the fishing rod is not increased, and operability does not decrease.

Advantageous Effects of Invention

According to the present invention, it is possible to obtain the fishing line guide that provides good operability to the fishing rod, that is efficiently reduced in weight, and that is less likely to be damaged, and the fishing rod to which such a fishing line guide is mounted.

BRIEF DESCRIPTION OF DRAWINGS

FIG. 7 is a view illustrating a state where the fishing line guide illustrated in FIG. 1 is fixed to a rod surface.

FIG. 8 is a view illustrating a first modification example of the fishing line guide.

FIG. 11 is a view illustrating a fourth modification example of the fishing line guide.

FIG. 12 is a view illustrating a fifth modification example of the fishing line guide.

DESCRIPTION OF EMBODIMENTS

Figure 1:
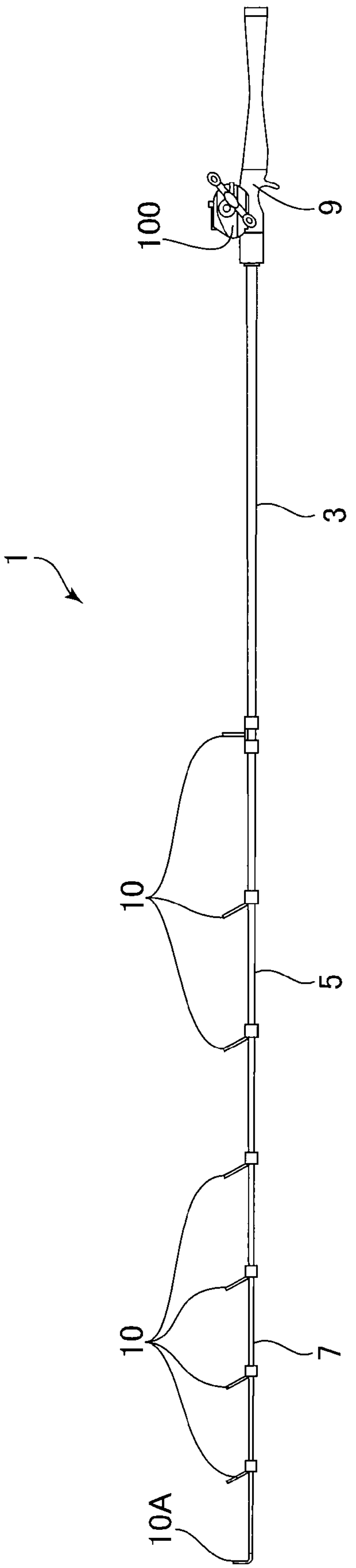
FIG. 1 is a view illustrating one embodiment of a fishing rod according to the present invention.

FIG. 1 is a view illustrating one embodiment of a fishing rod according to the present invention.

A fishing rod 1 illustrated in FIG. 1 is configured in a telescopic type in which a middle rod 5 and a tip rod 7 are accommodated in a base rod 3 and these rods are sequentially drawn out and joined to each other. Each rod is configured as a tubular body, and is made, for example, by winding a prepreg sheet made of a fiber-reinforced resin obtained by impregnating reinforcing fibers with a synthetic resin. The tubular body made of such a material is made by a known manufacturing method, and the rods constituting the fishing rod of the present invention may have a solid structure in addition to such a tubular body structure. In addition, the number of the rods (the number of joints) stored inside the base rod 3 is optional, and the joining method may be an ordinarily jointed type, a socket-and-spigot jointed type, or the like in addition to the telescopic type. In addition, the fishing rod may be a single rod instead of being formed by joining a plurality of rods.

A reel seat 9 comprising a reel leg placement portion is disposed on a proximal end side of the base rod 3. A fixed hood and a movable hood are provided on both sides of the reel leg placement portion of the reel seat 9 in an axial direction, and by placing a reel leg of a fishing reel 100 on the reel leg placement portion and moving the movable hood in the axial direction, the reel leg is fastened and fixed onto the reel leg placement portion. Incidentally, the movable hood may be disposed on one of a tip side and the proximal end side, and both sides may be configured as the movable hoods.

Fishing line guides 10 and 10A that guide a fishing line are mounted to the base rod 3, the middle rod 5, and the tip rod 7 (the fishing line guide 10A is a top guide). A plurality of the fishing line guides 10 are disposed on a surface of each rod at predetermined intervals along the axial direction. Incidentally, the fishing line guides 10 include a type fixed by a fixing method to be described later (fixed guide) and a type that is slidable along the rod surface when the rod is stored (floating guide).

Next, a configuration of the fishing line guide 10 mounted to the fishing rod described above will be described with reference to FIGS. 2 to 6. In the drawings, the fixed guide fixed to the surface of the rod is illustrated, and the attachment position for each rod is on a front end side. For this reason, the size and the like of the fishing line guide are changed as appropriate depending on an outer diameter of the rod to which the fishing line guide is attached.

The fishing line guide 10 of the present embodiment comprises a guide leg 11 extending in the axial direction of the rod to which the fishing line guide 10 is attached; a fishing line insertion portion 13 through which the fishing line is inserted; and a connecting portion 15 rising from an end on the tip side of the guide leg 11 and connected to the fishing line insertion portion 13, and these portions are formed in a flat plate shape. The fishing line guide 10 of the present embodiment is integrally formed by injection-molding a fiber-reinforced resin obtained by impregnating a matrix resin (for example, a thermosetting resin such as epoxy resin, unsaturated polyester, phenol, or vinyl ester, or a thermoplastic resin such as polyether sulfone (PES), polyphenylene sulfide (PPS), polyether ketone (PEEK), polycarbonate (PC), or polyamide (PA)) with short fibers or long fibers (for example, formed of various reinforcing fibers such as carbon fibers and glass fibers) serving as reinforcing fibers.

In addition, the fishing line guide 10 of the present embodiment has a single leg structure in which the guide leg 11 extends in the axial direction on the proximal end side, and has a structure in which the connecting portion 15 that rises while curving is provided at the end on the tip side of the guide leg 11 and the fishing line insertion portion 13 comprising a circular opening 13A is provided on an upper end side of the connecting portion 15. In this case, a guide ring formed from ceramic, metal, or the like may be attached to the circular opening 13A so as to enhance the slidability of the fishing line.

Figure 7A:
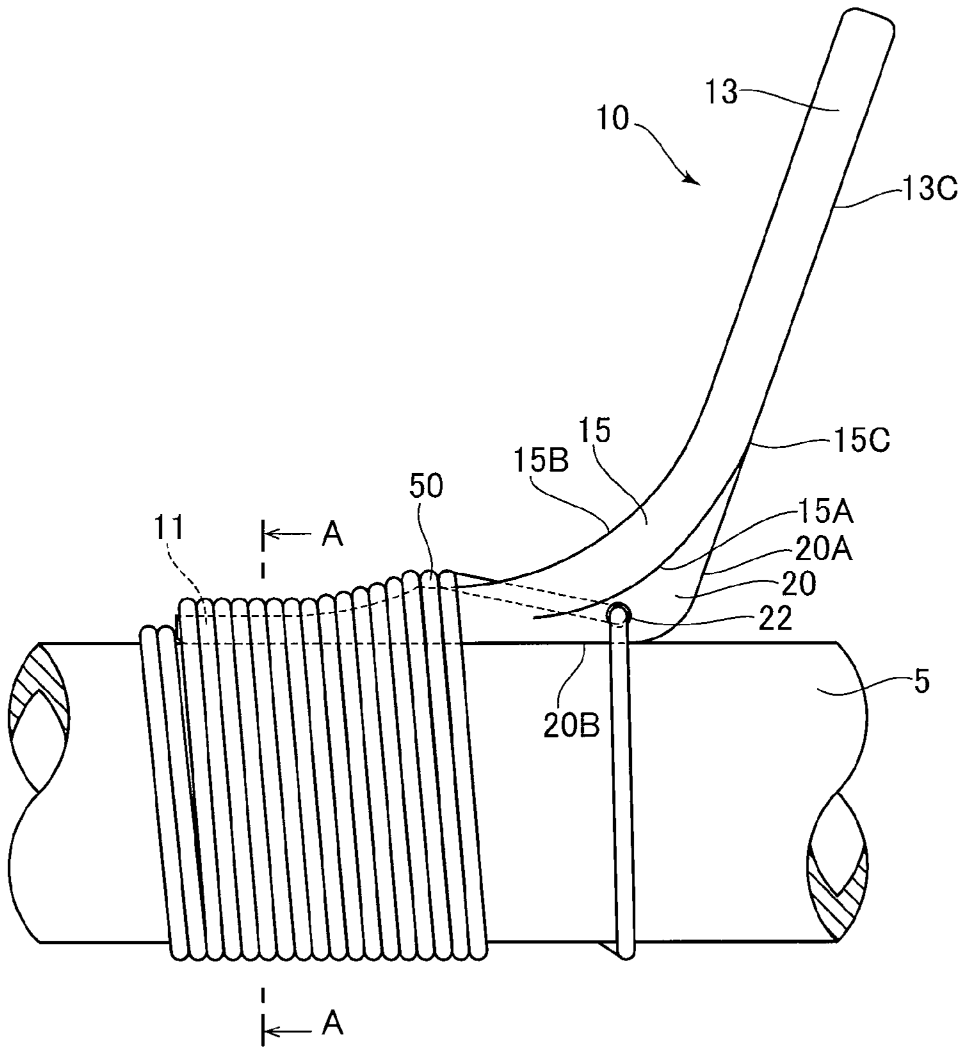
FIG. 7A is a side view.

In the above-described configuration, the guide leg 11 is a region serving as a fixed portion with respect to the rod 5 (refer to FIG. 7). The connecting portion 15 is defined as a region above an inflection point P1 where the fishing line guide starts to rise in a curved shape with respect to the rod surface (horizontal plane P) when viewed from the side in a state where the fishing line guide is fixed to the rod surface. In addition, the fishing line insertion portion 13 is defined as a region above a position P2, which is the lowermost end, in the circular opening 13A. For this reason, in the connecting portion 15, when viewed from the side, a ridge line 15A on a lower surface side (rod tip side) is curved, and a ridge line 15B on an upper surface side (proximal end side) is also similarly curved (the connecting portion has a substantially uniform thickness).

Incidentally, in the example illustrated in FIG. 3, the inflection point P1 of the ridge line 15A is present at a position slightly raised from a lowermost end (horizontal plane P) of the guide leg 11; however, the ridge line 15A may extend to the lowermost end of the guide leg 11 depending on a protruding shape of a rib 20 to be described later. Namely, the inflection point P1 of the lower ridge line 15A defining the connecting portion 15 may be present at the lowermost end (horizontal plane P) of the guide leg 11.

As described above, the fishing line insertion portion 13 is integrated with the connecting portion 15, and the connecting portion 15 is formed to curve and rise from the guide leg 11. In this case, a rising angle $\alpha$ of a surface 15C on the rod tip side of the connecting portion 15 with respect to the guide leg 11 is not particularly limited; however, it is preferable that the rising angle $\alpha$ is formed in a range of $30° \leq \alpha \leq 85°$ such that the fishing line can be smoothly guided and easily removed even when the fishing line is entangled in a loop shape. In addition, in the present embodiment, the surface 15C of the connecting portion 15 is formed to be flush with a surface 13C on the rod tip side of the fishing line insertion portion 13, and forms a plane Pd defining the rising angle $\alpha$.

The rib 20 protruding to the rod tip side from the vicinity of the fixed portion of the guide leg 11 toward the fishing line insertion portion 13 is formed on the fishing line guide 10. As illustrated in FIG. 3, when the fishing line guide is viewed from the side, the rib 20 is formed to protrude from the ridge line 15A of the connecting portion 15 toward the rod tip side, and is integrated with the surface 15C of the connecting portion 15 at an upper end position 20*a*. Namely, an end surface 20A on a protruding side (end surface on the rod tip side) of the rib 20 of the present embodiment is formed to be flush with the surface 15C of the connecting portion 15 and the surface 13C on the rod tip side of the fishing line insertion portion 13.

In general, in the fishing line guide 10 of the type described above, when the fishing line is caught, a large load (bending stress in a clockwise direction in FIG. 3) acts on the vicinity of a fixed portion from the guide leg 11 to the connecting portion 15 (curved portion transitioning from the inflection point P1 to the connecting portion 15); however, by forming the rib 20 at the portion, the rigidity is increased, and an effective reinforcing effect can be obtained. Namely, rigidity that compensates for the low elastic modulus of the injection molding material (fiber-reinforced resin material) can be ensured.

Figure 5:
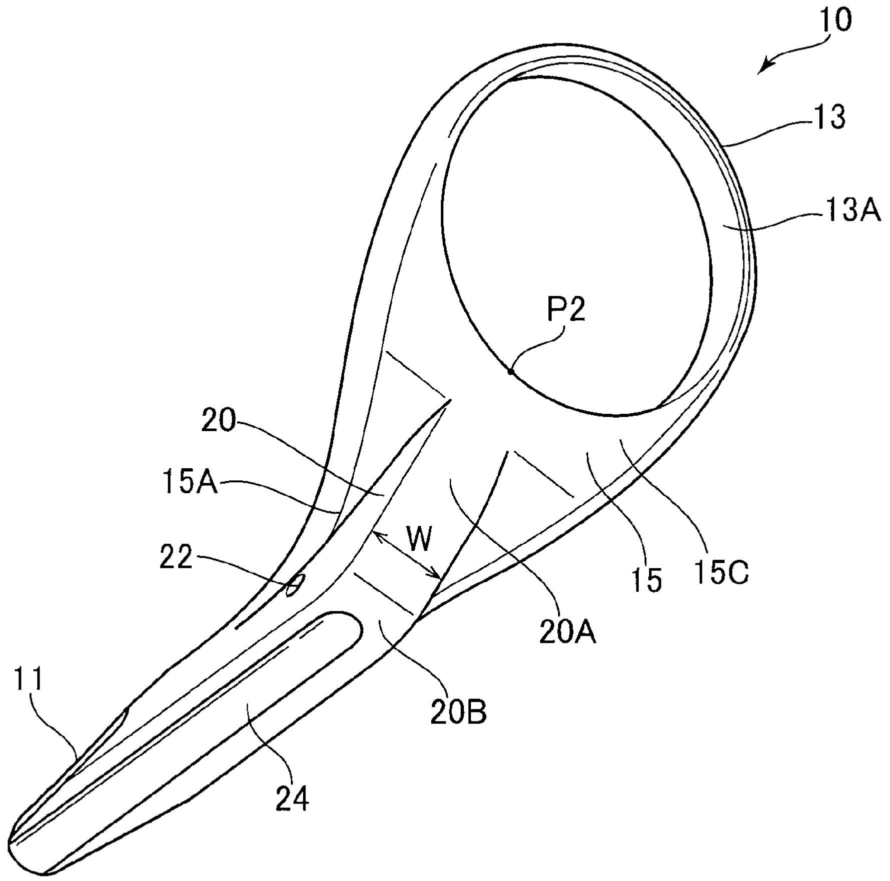
FIG. 5 is a perspective view of the fishing line guide illustrated in FIG. 1 when viewed from below on a rod tip side.

The rib 20 may be formed on the surface 15C on the rod tip side of the connecting portion 15 in a transition region from the guide leg 11 of the fishing line guide to the fishing line insertion portion 13; however, as illustrated in FIG. 5, it is preferable that the rib 20 is formed at a central portion of the surface 15C on the rod tip side of the connecting portion 15. Namely, the rib 20 may be formed over the entirety of the surface 15C on the rod tip side; however, as illustrated in FIG. 5, by forming the rib 20 at the central portion, the reinforcing effect can be efficiently enhanced without increasing the weight of the entirety of the fishing line guide. In this case, the upper end position 20*a* of the rib 20 may be formed to be located at the circular opening 13A of the fishing line insertion portion 13; however, since a particularly large load does not act in the vicinity of the circular opening 13A, as illustrated in FIG. 5, the rib 20 may be formed up to a substantially intermediate position of the connecting portion 15.

In addition, as illustrated in FIG. 3, it is preferable that the rib 20 is formed with a height that does not protrude from the surface 13C on the rod tip side of the fishing line insertion portion 13 toward the rod tip side, namely, at a height that does not protrude from the plane Pd toward the rod tip side. The reason is that there is a possibility that when the rib 20 is formed to be too high (thick), a rigidity distribution changes significantly, thereby resulting in a decrease in strength instead. In addition, when the rib 20 is high, the rib 20 is likely to receive wind resistance, and operability of the fishing rod decreases. Therefore, it is preferable that the rib 20 is formed with a height equal to or lower than the plane Pd.

Figure 6:
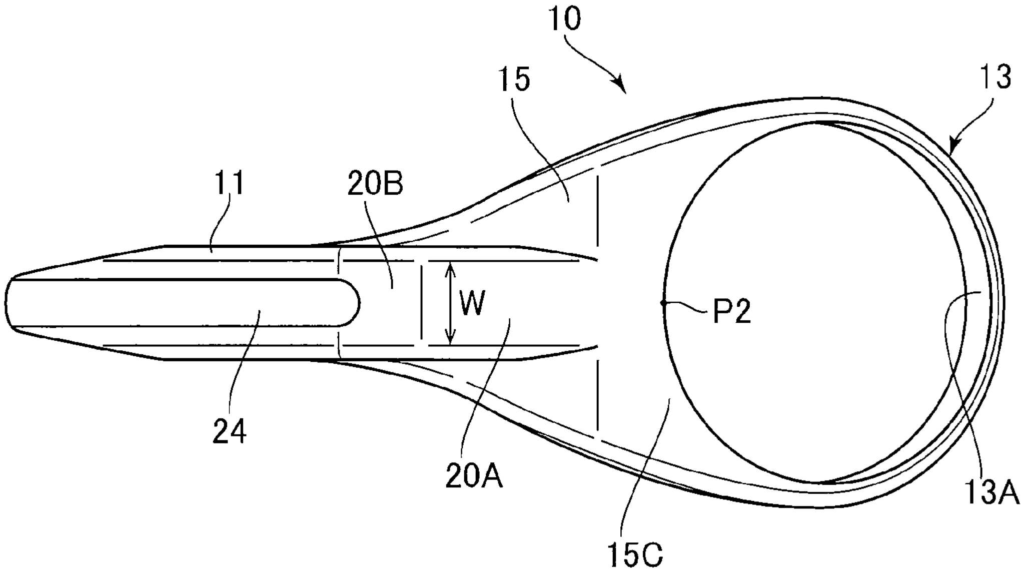
FIG. 6 is a rear view of the fishing line guide illustrated in FIG. 1.

In addition, in the present embodiment, as illustrated in FIGS. 5 and 6, a width W of the rib 20 is formed to be uniform; however, it is preferable that the width W is formed to be wider on a fixed side with respect to the rod and to become narrower as the rib 20 extends toward a fishing line insertion portion side. With such a configuration, an efficient reinforcing effect can be obtained without increasing the weight, and it is possible to withstand a larger load without stress being partially concentrated.

Furthermore, it is preferable that a height H of the rib 20 is formed to be higher on the fixed side with respect to the rod and to become lower as the rib 20 extends toward the fishing line insertion portion 13 side. With such a configuration, the strength can be efficiently improved without stress being partially concentrated, and since the rib 20 serves as a taper in combination with the structure in which the width W changes, molding can be easily performed. In addition, since an upper end side of the rib 20 is less likely to receive wind resistance, the operability of the fishing rod is prevented from decreasing.

Figure 3A:
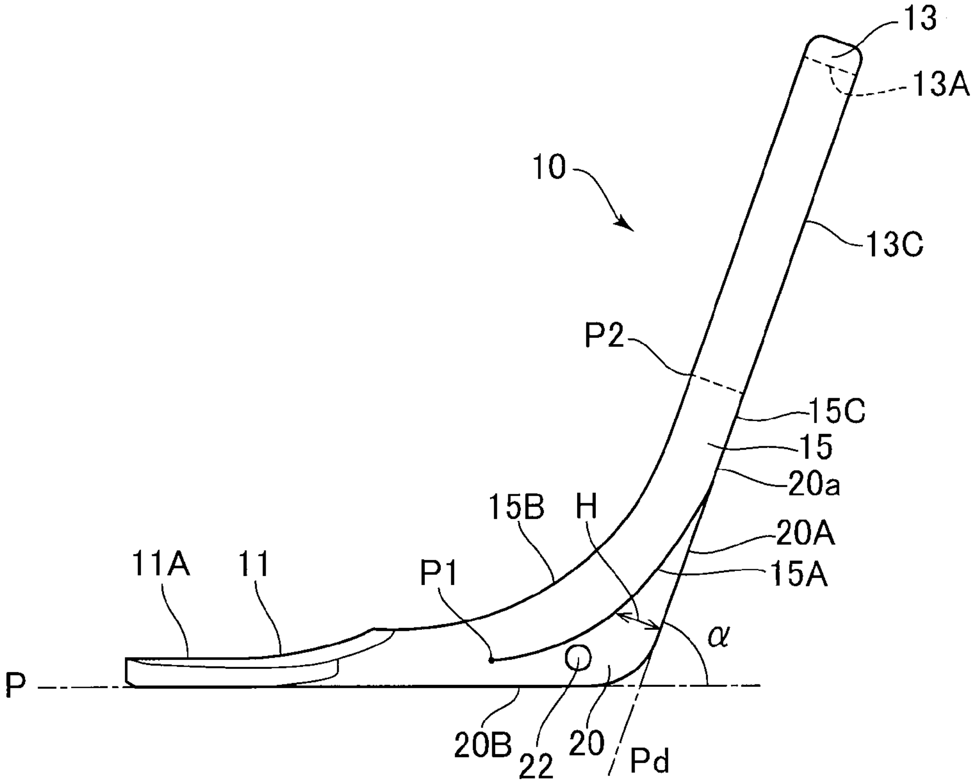
FIG. 3A is a side view of the fishing line guide illustrated in FIG. 1.
Figure 3B:
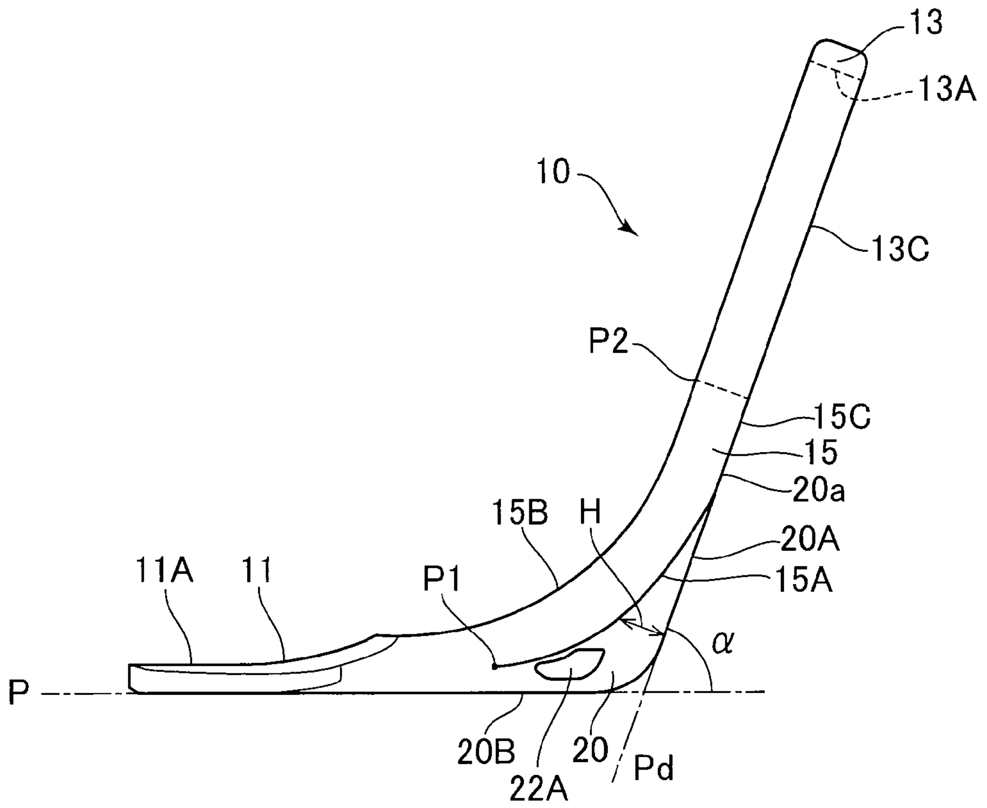
FIG. 3B is a side view of a fishing line guide illustrating a modification example of a through-hole of a rib.
Figure 4:
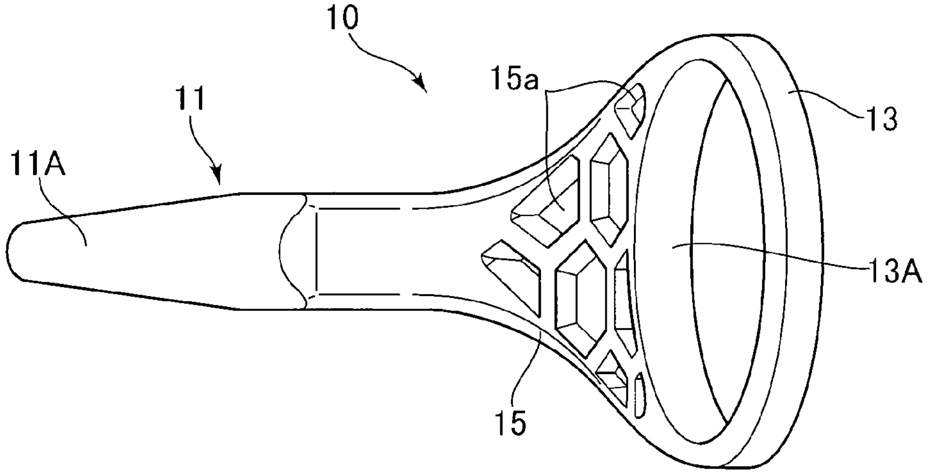
FIG. 4 is a plan view of the fishing line guide illustrated in FIG. 1.

It is preferable that a through-hole 22 is formed in the rib 20. As illustrated in FIG. 3A, the through-hole 22 of the present embodiment is formed on a fixed portion side on which a yarn 50 for fixing (refer to FIG. 7) is wound around the guide leg 11. By forming the through-hole 22 at such a position, when the fishing line guide 10 is fixed to the rod, the yarn 50 to be wound can be inserted and pillow-winded, and the fishing line guide can be retained in the fixed state. In addition, since the weight can be reduced by forming the through-hole 22, a plurality of the through-holes may be formed, and some or all thereof may be configured as recessed portions instead of being configured as through-holes. Incidentally, the size (inner diameter) or shape of the through-hole is not limited, and for example, as in a through-hole 22A illustrated in FIG. 3B, the through-hole can be modified as appropriate, such as being formed to a size that allows two or more yarns 50 to pass therethrough.

As illustrated in FIG. 3, the end surface 20A on the protruding side (end surface on the rod tip side) of the rib 20 is formed to be flush with the surface 15C of the connecting portion 15 and the surface 13C on the rod tip side of the fishing line insertion portion 13, and the end surface 20A is bent by approximately 90° and is connected to a lower end surface 20B that comes into contact with the surface of the rod to which the fishing line guide 10 is fixed. As described above, when the fishing line guide 10 is fixed to the rod, the lower end surface 20B of the rib 20 comes into contact with the rod surface, so that even when a large bending stress acts on the fishing line guide, wobbling, deformation, or the like is less likely to occur, and a stable fixed state can be maintained. Namely, in a fishing line guide of the related art in which the rib 20 is not formed, when the fishing line guide is fixed to the surface of the rod, a gap portion of a connecting portion having a curved shape is filled with a resin for fixing, which causes the fixed state of the fishing line guide to become unstable and causes a deterioration in appearance. However, since the rib 20 is present in such a gap portion, the fixed state of the fishing line guide is stabilized, and the appearance is prevented from deteriorating.

In addition, the lower end surface 20B of the rib 20 may be extended in the axial direction as it is to be integrated with the guide leg 11, and may serve as a fixed portion that comes into contact with the surface of the rod. In this case, as illustrated in FIGS. 5 and 6, it is preferable that a groove 24 extending along the axial direction of the rod is formed in a portion fixed to the rod surface.

Figure 2:
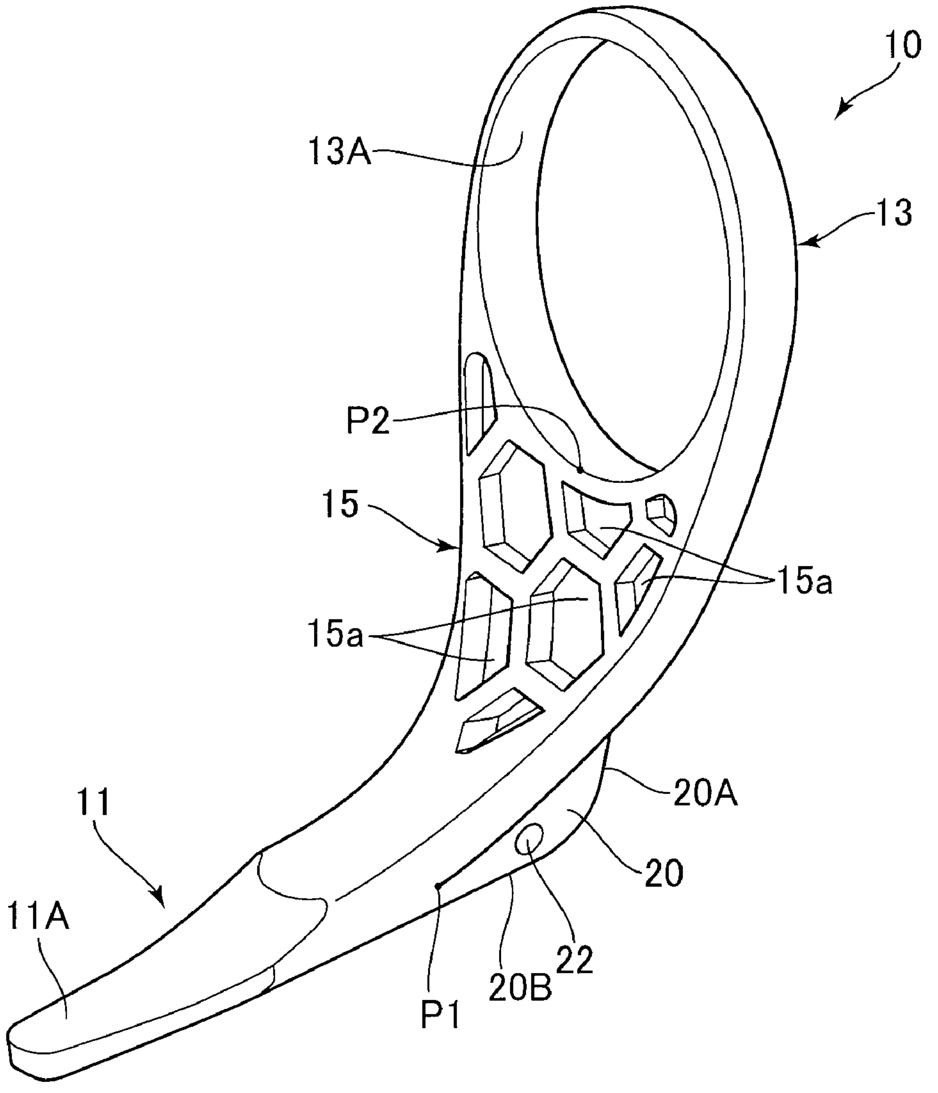
FIG. 2 is a perspective view of a fishing line guide illustrated in FIG. 1 when viewed from above a proximal end side.

In addition, since the fishing line guide 10 of the present embodiment is less likely to come off and the fixed state can be stabilized due to the above-described configuration, the weight of the guide leg 11 can be reduced by thinning a distal end side 11A thereof. Furthermore, as illustrated in FIG. 2, the weight can also be reduced by forming a large number of recessed portions 15*a* having a polygonal shape in the connecting portion 15. Namely, according to the fishing rod in which the plurality of fishing line guides 10 with the above-described configuration are installed on the rod, the weight can be reduced, so that the operability can be improved, and the appearance does not deteriorate.

Next, a method for fixing the fishing line guide 10 with the above-described configuration to the surface of the rod (here, the middle rod 5) will be described with reference to FIG. 7.

When the fishing line guide 10 is fixed to the surface of the rod 5, the guide leg 11 is placed on the surface of the rod 5, and the yarn 50 for fixing is wound around the guide leg 11. Then, after the yarn 50 is wound, a resin for fixing is applied from the surface thereof to stabilize the fixed state.

When the yarn 50 is wound, the yarn can be inserted through the through-hole 22 formed in the rib 20, and can be pillow-winded, so that it is possible to improve the pull-out strength of the fishing line guide while improving the rigidity. During the fixing operation, in the fishing line guide of the related art, the resin enters a gap between the fishing line guide and the rod surface, whereby workability becomes poor; however, since the rib 20 is formed, the resin does not enter, and workability can be improved. In addition, since the resin enters the through-hole 22, and an anchor effect between the through-hole 22 and the rod surface can also be obtained, the fixing strength is improved, and the fixed state of the fishing line guide is also stabilized.

Figure 7B:
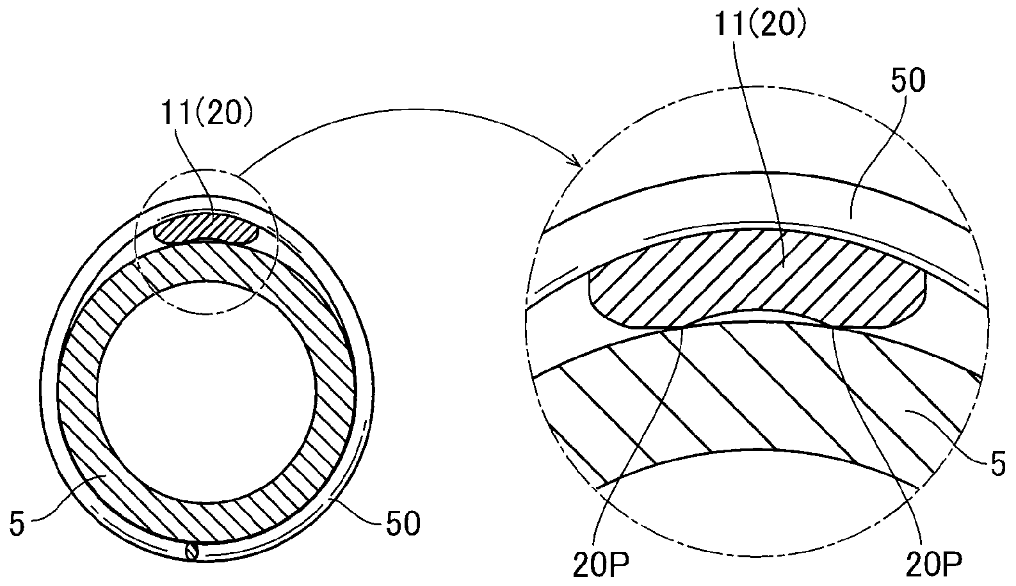
FIG. 7B is a cross-sectional view taken along line A-A of FIG. 7A.

Furthermore, as illustrated in FIG. 7B, when a lower surface (guide leg) of the rib 20 is brought into contact with the rod surface, since the groove 24 is formed in the rib 20, two-point contact with the rod is made at contact positions 20P, and the fixed state can be stabilized.

The present invention is not limited to the embodiment described above, and can be modified in various forms. Hereinafter, configuration examples of modification examples will be described.

Incidentally, in the description of the following various modification examples, the same components as those of the embodiment described above are denoted by the same reference signs, and detailed description thereof will not be repeated.

Figure 8A:
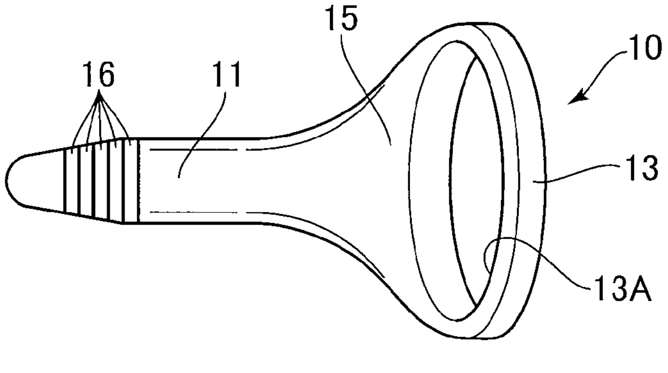
FIG. 8A is a plan view of a guide leg portion.
Figure 8B:
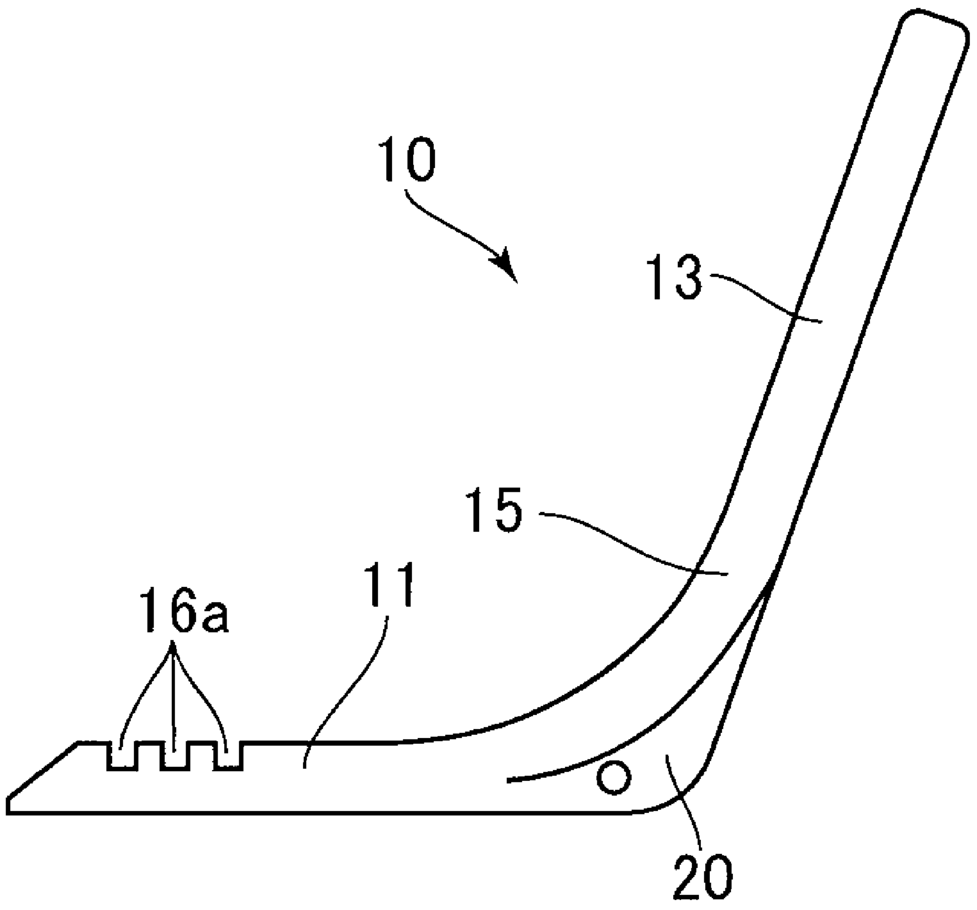
FIG. 8B is a side view.
Figure 8C:
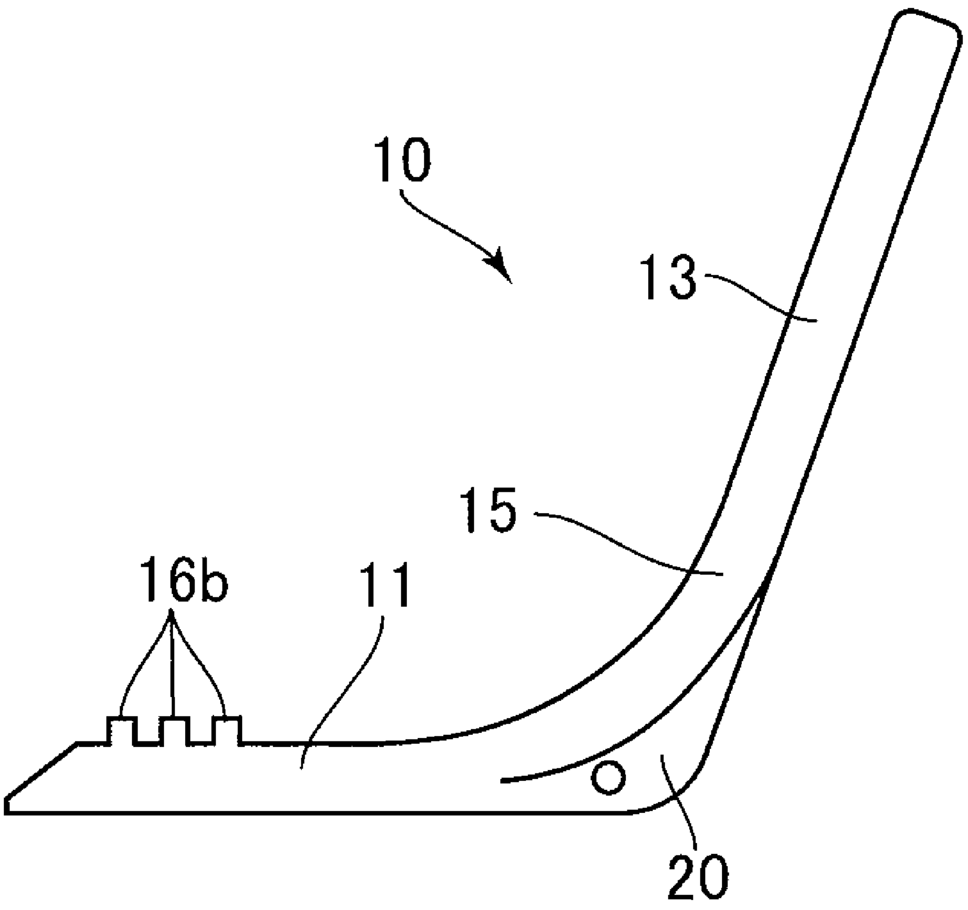
FIG. 8C is a view illustrating a modification example of a recessed and protruding structure.

FIG. 8 is a view illustrating a first modification example of the fishing line guide, FIG. 8A is a plan view of a guide leg portion, FIG. 8B is a side view, and FIG. 8C is a view illustrating a modification example of a recessed and protruding structure. As illustrated in this modification example, a plurality of recessed and protruding portions 16 (retaining structure) may be formed along the axial direction on a portion of a surface of the guide leg 11 around which the yarn 50 is wound. The recessed and protruding portions 16 may be recessed portions 16*a* that are continuously formed as illustrated in FIG. 8B, or may be protruding portions 16*b* that are continuously formed as illustrated in FIG. 8C.

By forming the recessed and protruding portions 16, when the yarn is fixed, the yarn is allowed to enter the recessed portion regions, so that the fishing line guide can be prevented from coming off.

Incidentally, various modifications can be made to a method for forming the recessed and protruding portions, and regarding the retaining structure, the surface may be roughened or knurling or the like may be formed.

Figure 9:
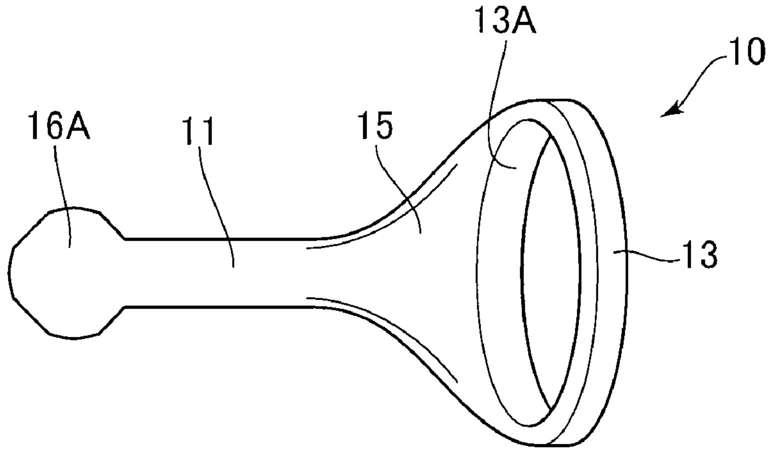
FIG. 9 is a view illustrating a second modification example of the fishing line guide, and is a plan view of a guide leg portion.

FIG. 9 is a view illustrating a second modification example of the fishing line guide, and is a plan view of a guide leg portion.

As described above, the retaining structure formed in the guide leg 11 can also be configured by forming a wide portion 16A on the distal end side of the guide leg 11.

Figure 10A:
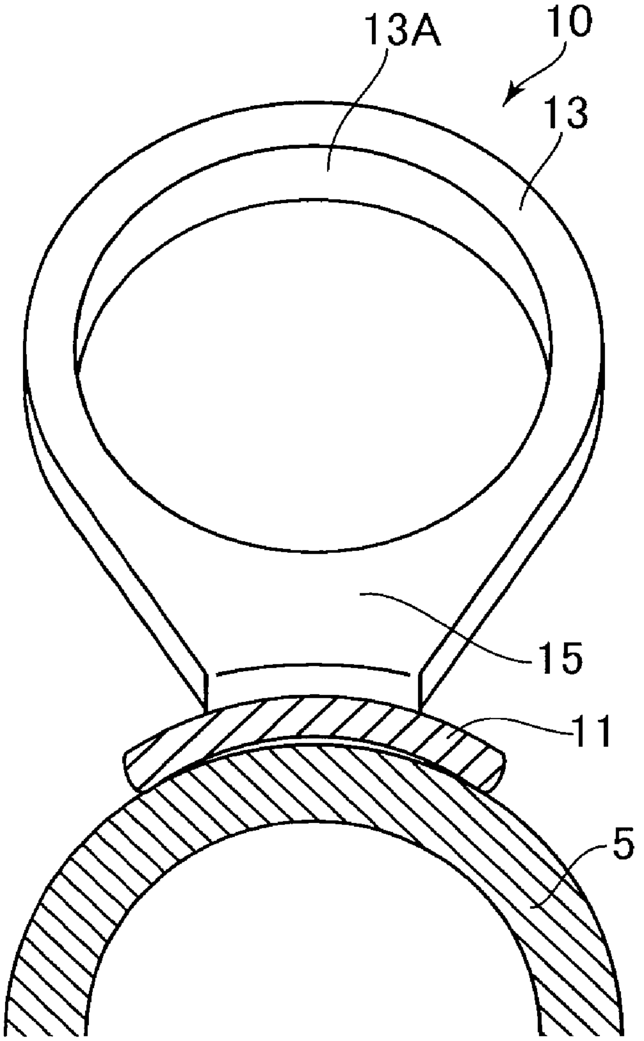
FIGS. 10A and 10B are views illustrating a third modification example of the fishing line guide, and are cross-sectional views illustrating respective guide leg portions.
Figure 10B:
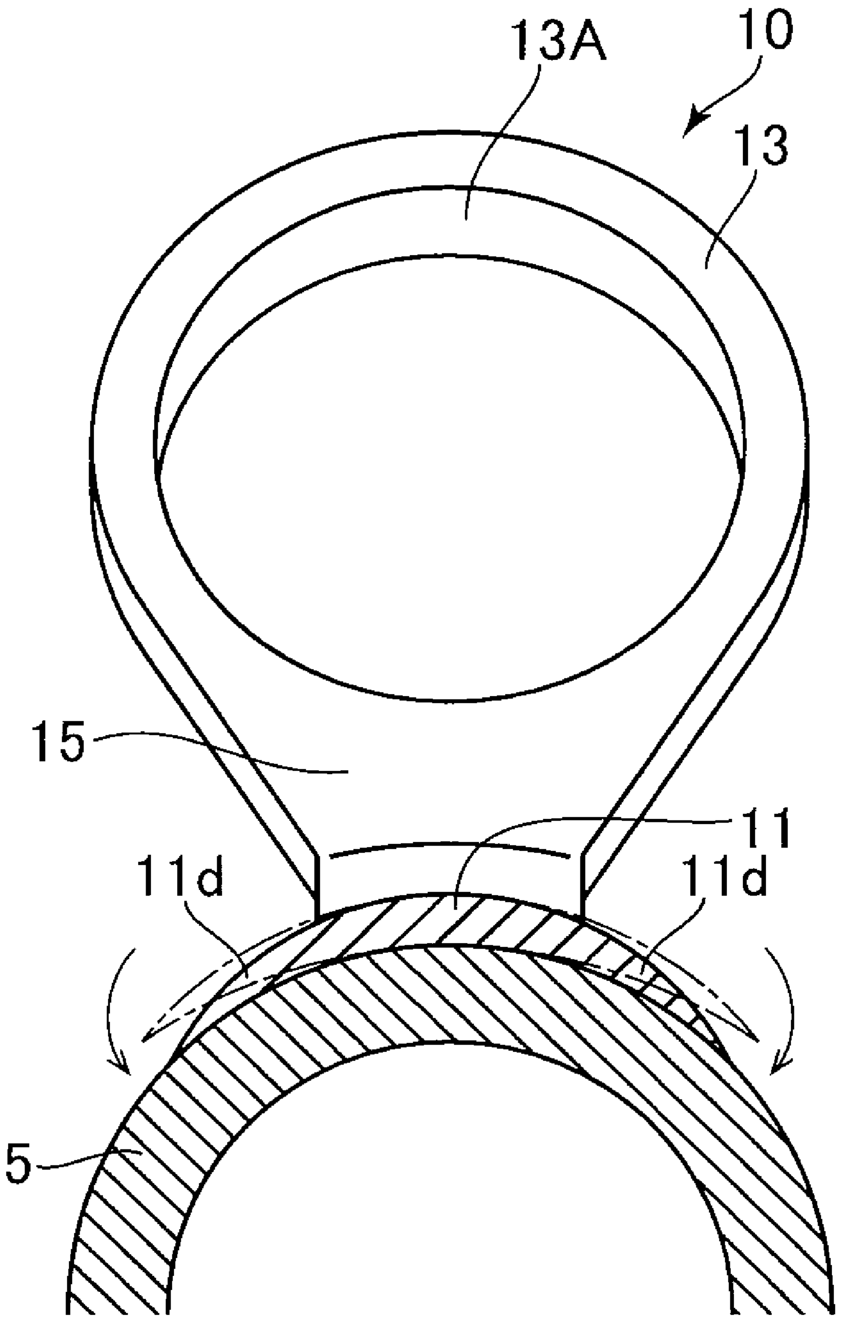

FIGS. 10A and 10B are views illustrating a third modification example of the fishing line guide, and are cross-sectional views of respective guide leg portions. As described above, the configuration may be such that the rib 20 is integrated with the guide leg 11, is brought into contact with the rod surface, and is wound with the yarn, or the configuration may be such that the rib 20 is fixed by bringing a back surface of the guide leg 11 into contact with the rod surface as it is without being extended in the axial direction.

In such a configuration, as illustrated in FIG. 10A, the guide leg 11 may be configured with a curved surface along the surface of the rod, or as illustrated in FIG. 10B, the guide leg 11 may be configured with a curved surface along the surface of the rod and both sides 11*d* of the guide leg 11 may be configured to be thin. As described above, by thinning both sides, when the yarn is wound, both the sides can be elastically deformed to come into contact with the rod surface, so that the fixing strength can be improved.

Figure 11A:
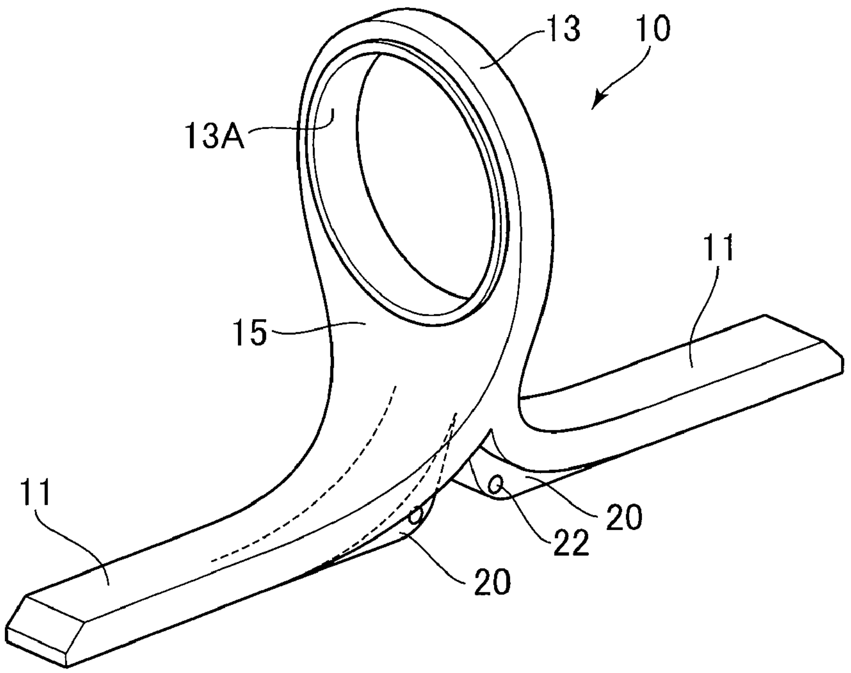
FIG. 11A is a perspective view.
Figure 11B:
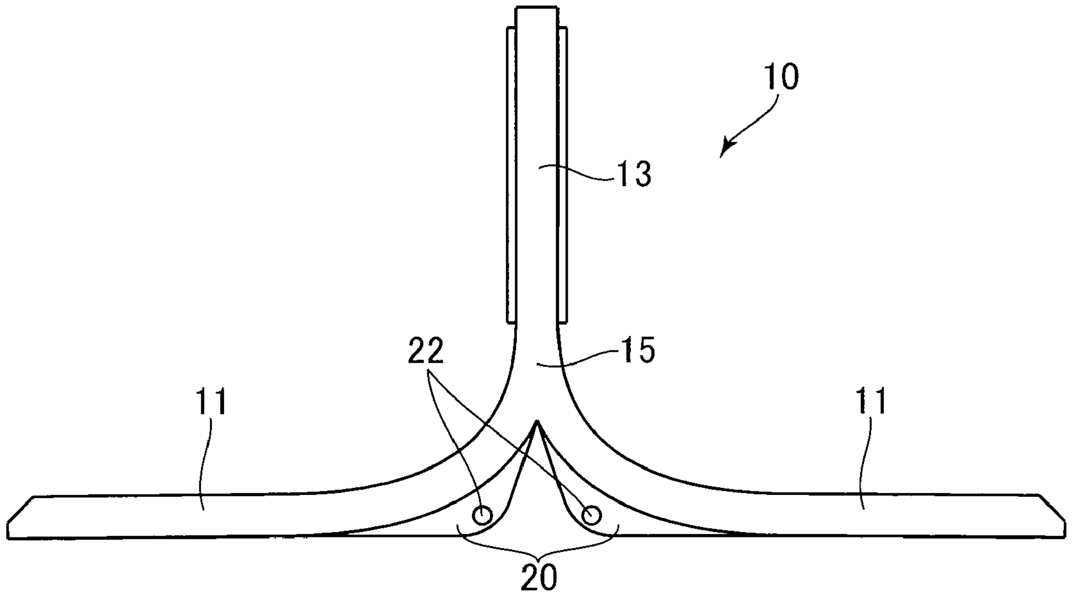
FIG. 11B is a side view.

FIG. 11 is a view illustrating a fourth modification example of the fishing line guide, FIG. 11A is a perspective view, and FIG. 11B is a side view.

Figure 11C:
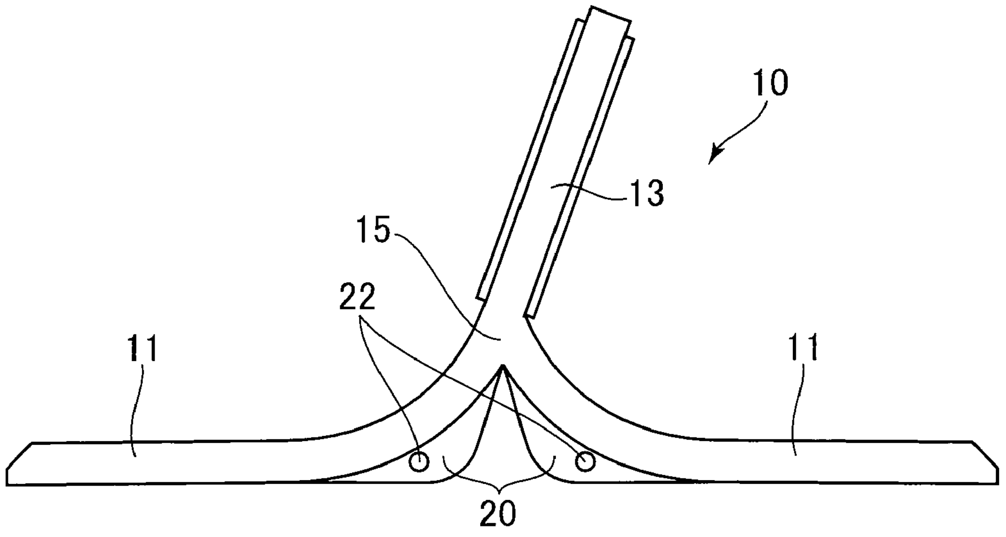
FIG. 11C is a view illustrating a modification example of a connecting portion.

The fishing line guide 10 of the embodiment described above has one leg structure in which the guide leg 11 extends to the proximal end side in the axial direction of the fishing rod; however, as illustrated in FIGS. 11A and 11B, the fishing line guide 10 may have a two-leg structure in which the guide legs 11 extend to both sides in the axial direction of the fishing rod with respect to the fishing line insertion portion 13, and may have a structure in which the fishing line insertion portion 13 rises vertically. In such a structure of the fishing line guide, the rib 20 may be formed only on one guide leg side; however, it is preferable that the ribs 20 are formed in respective facing regions of both the guide legs 11. Furthermore, as illustrated in FIG. 11C, the fishing line insertion portion 13 may be structured to rise in an inclined manner.

Figure 12A:
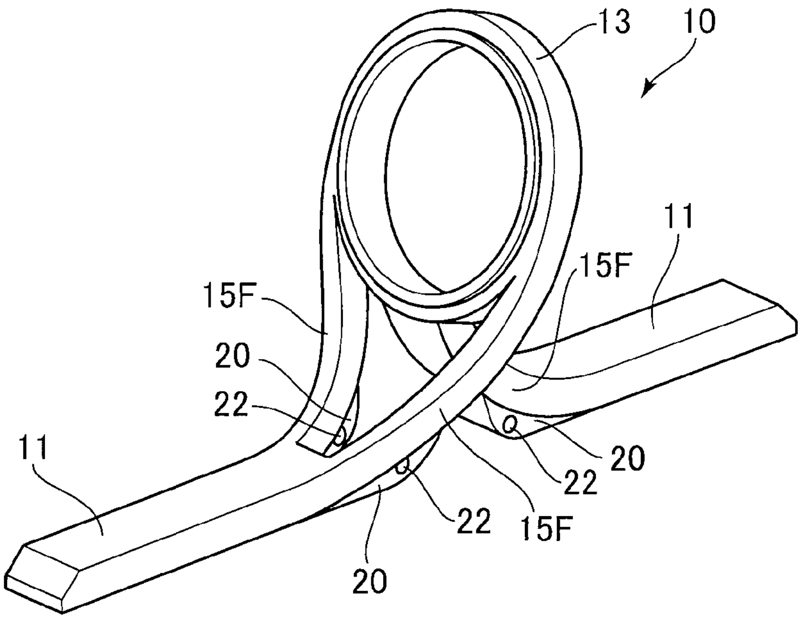
FIG. 12A is a perspective view.
Figure 12B:
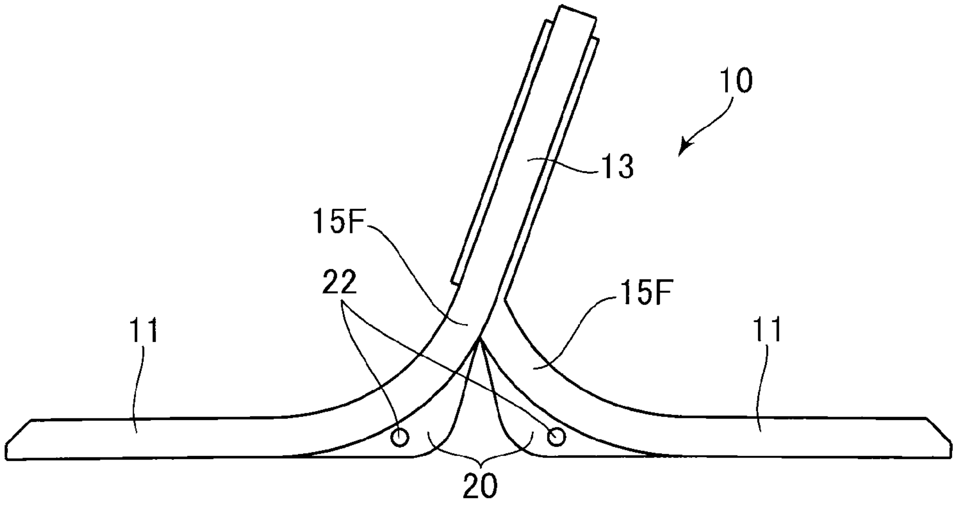
FIG. 12B is a side view.

FIG. 12 is a view illustrating a fifth modification example of the fishing line guide, FIG. 12A is a perspective view, and FIG. 12B is a side view.

In the embodiment and the modification examples described above, the connecting portion 15 is formed in a plate shape; however, the connecting portion may have a frame structure in which the connecting portion extends from both sides of 13 of the fishing line insertion portion to the guide leg 11. In this case, the rib 20 may be formed on each frame 15F. As described above, the shape of the connecting portion 15 can also be modified as appropriate.

Figure 13:
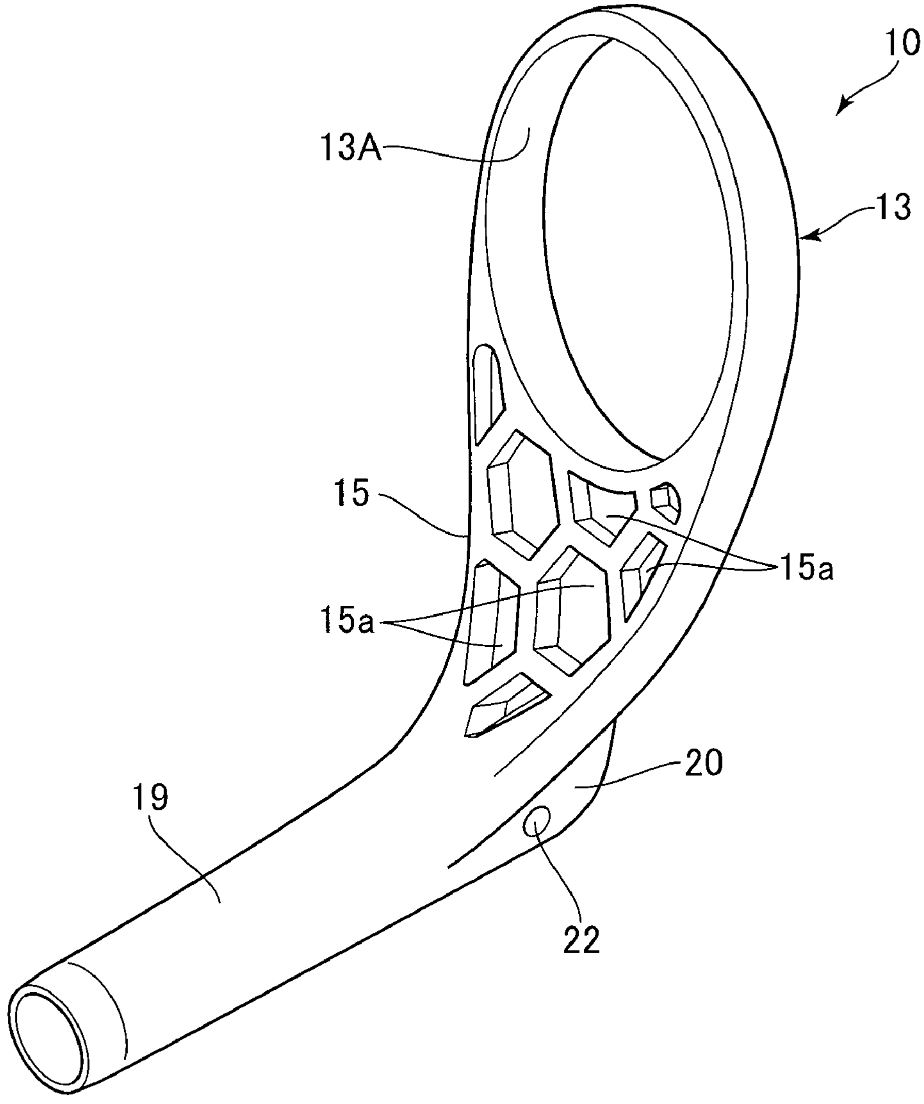
FIG. 13 is a view illustrating a second embodiment of the fishing line guide.

FIG. 13 is a view illustrating a second embodiment of the fishing line guide, and is an enlarged view illustrating a fishing line guide (tip guide) mounted to the tip rod 7 illustrated in FIG. 1.

The rib 20 of a fishing line guide 10A of this embodiment can be integrally formed with a cylindrical portion 19 press-fitted to a distal end of the tip rod 7. The fishing line guide 10A is press-fitted, adhered, and fixed to the tip rod 7; however, by forming the through-hole 22 in the rib 20, anchor effect can be obtained, and adhesive strength can be increased.

The embodiment of the present invention has been described above; however, the present invention is not limited to the embodiment described above, and can be modified in various forms.

In the embodiment described above, the fixed guide fixed to the rod has been described; however, a similar rib can also be formed on the connecting portion for the floating guide. In addition, the fishing line guide 10 is formed from a fiber-reinforced resin material, but can also be formed from a metal material or the like. In addition, the present invention is characterized in that the rib 20 is formed on the surface on the rod tip side of the connecting portion rising from the fixed portion of the fishing line guide, and the other configurations are not limited to the shapes and the like illustrated in the drawings. Furthermore, the size and shape of the rib 20 can be modified as appropriate.

REFERENCE SIGNS LIST

1 Fishing rod
3 Base rod

5 Middle rod
7 Tip rod
10, 10A Fishing line guide
11 Guide leg
13 Fishing line insertion portion
15 Connecting portion
20 Rib
22 Through-hole

The invention claimed is:

1. A fishing line guide comprising:

a guide leg serving as a fixed portion with respect to a rod;

a fishing line insertion portion with a circular opening through which a fishing line is inserted;

a connecting portion rising from the guide leg and connected to the fishing line insertion portion; and a rib protruding to a rod tip side from the vicinity of the fixed portion of the guide leg toward the fishing line insertion portion, wherein the connecting portion is plate shaped and rises in a curve from the guide leg, the rib is at a central portion of the connecting portion, the connecting portion has a first rod tip side surface, the fishing line insertion portion has a second rod tip side surface, the first rod tip side surface and the second rod tip side surface are continuous, the fishing line insertion portion does not extend beyond the second rod tip side surface along an axial direction of the rod, the rib protrudes from the first rod tip side surface but a height of the rib does not protrude beyond the second rod tip side surface toward the rod tip side, a width of the rib in a direction perpendicular to an axial direction and between a right side and a left side of the circular opening is wider on a fixed side with respect to the rod, and becomes narrower as the rib extends toward a fishing line insertion portion side, and an end surface on a rod tip side of the rib is coplanar with the first rod tip side surface and the second rod tip side surface.

2. The fishing line guide according to claim 1, wherein a height of the rib is higher on a fixed side with respect to the rod, and becomes lower as the rib extends toward a fishing line insertion portion side.

3. The fishing line guide according to claim 1, wherein a through-hole is formed on a fixed portion side of the rib.

4. The fishing line guide according to claim 1, wherein the rib is formed to come into contact with a rod surface when the fishing line guide is fixed to the rod, and a groove extending along an axial direction of the rod is formed in a portion fixed to the rod surface.

5. The fishing line guide according to claim 1, wherein the fishing line guide is integrally formed by injection-molding a fiber-reinforced resin material.

6. A fishing rod, wherein the fishing line guide is attached by winding a yarn around the guide leg according to claim 1 on the rod and applying a resin material to a surface of the yarn.

* * * * *